(12) United States Patent
Ferrant et al.

(10) Patent No.: US 9,382,803 B2
(45) Date of Patent: Jul. 5, 2016

(54) LAMINATED ABUTMENT, A ROTOR PROVIDED WITH SUCH AN ABUTMENT, AND AN AIRCRAFT

(71) Applicant: AIRBUS HELICOPTERS, Marignane, Cedex (FR)

(72) Inventors: Matthieu Ferrant, Aix En Provence (FR); Mathieu Legrand, Aix En Provence (FR)

(73) Assignee: Airbus Helicopters, Marignane (FR)

( * ) Notice: Subject to any disclaimer, the term of this patent is extended or adjusted under 35 U.S.C. 154(b) by 824 days.

(21) Appl. No.: 13/719,817

(22) Filed: Dec. 19, 2012

(65) Prior Publication Data

US 2013/0164143 A1   Jun. 27, 2013

(30) Foreign Application Priority Data

Dec. 27, 2011  (FR) ..................................... 11 04112

(51) Int. Cl.
*B64C 11/12* (2006.01)
*F01D 5/14* (2006.01)
*F16F 1/387* (2006.01)

(52) U.S. Cl.
CPC ............... *F01D 5/147* (2013.01); *F16F 1/387* (2013.01)

(58) Field of Classification Search
CPC ........... B64C 27/35; B64C 27/51; F16F 1/40; F16F 1/387; F16F 1/403; F16F 1/406
USPC ..................................................... 416/210 R
See application file for complete search history.

(56) References Cited

U.S. PATENT DOCUMENTS

| | | | |
|---|---|---|---|
| 2,958,526 A | | 11/1960 | Ulderup |
| 3,862,812 A | * | 1/1975 | Gorndt .................... B64C 27/35 416/134 R |

(Continued)

FOREIGN PATENT DOCUMENTS

| | | |
|---|---|---|
| EP | 0187265 A2 | 7/1986 |
| FR | 2497173 A1 | 7/1982 |

(Continued)

OTHER PUBLICATIONS

Search Report and Written Opinion; Application No. FR 1104112; dated Sep. 13, 2012.

*Primary Examiner* — Craig Kim
*Assistant Examiner* — Jason Fountain
(74) *Attorney, Agent, or Firm* — Brooks Kushman P.C.

(57) ABSTRACT

A laminated abutment (10) comprising an inner strength member (11), an outer strength member (12), and an elastomeric member (15) comprising a stack of main layers (20, 30) that are flexible and of secondary layers (40) that are rigid. The stack comprises at least one first main layer (20) and at least one second main layer (30), each first main layer (20) presenting, in a lead-lag plane (PTRA), a first thickness (e1) that varies between a minimum first thickness ($e1_{min}$) on the pitch-variation axis (AXPAS) and a maximum first thickness ($e1_{max}$) on the flapping axis (AXBAT), and each second main layer (30) presenting, in a lead-lag plane (PTRA), a second thickness (e2) that varies between a minimum second thickness ($e2_{min}$) on the flapping axis (AXBAT) and a maximum second thickness ($e2_{max}$) on the pitch-variation axis (AXPAS).

20 Claims, 4 Drawing Sheets

(56) References Cited

U.S. PATENT DOCUMENTS

| | | |
|---|---|---|
| 4,419,398 A | 12/1983 | Coffy |
| 4,765,758 A | 8/1988 | O'Donnell |
| 4,886,419 A | 12/1989 | McCafferty |
| 5,449,152 A | 9/1995 | Byrnes |
| 5,489,193 A * | 2/1996 | Levallard ................ F16F 13/08 267/140.13 |
| 5,913,659 A | 6/1999 | Doolin |
| 9,085,357 B2 * | 7/2015 | Davis ..................... B64C 27/35 |
| 2003/0235499 A1 | 12/2003 | Schmaling |
| 2011/0243731 A1 | 10/2011 | Meyer |

FOREIGN PATENT DOCUMENTS

| | | |
|---|---|---|
| GB | 660560 A | 11/1951 |
| WO | 2010068209 A1 | 6/2010 |

* cited by examiner

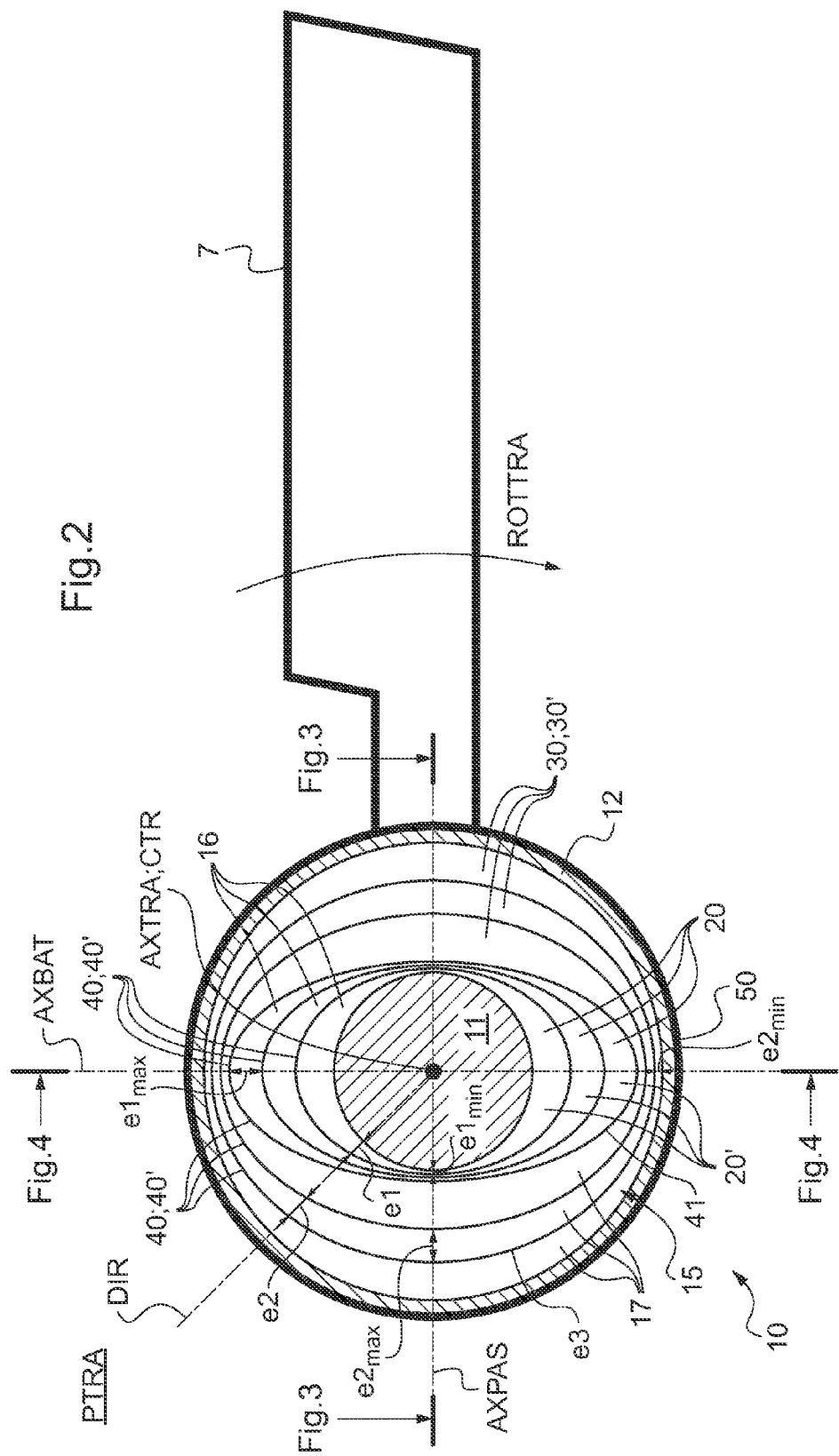

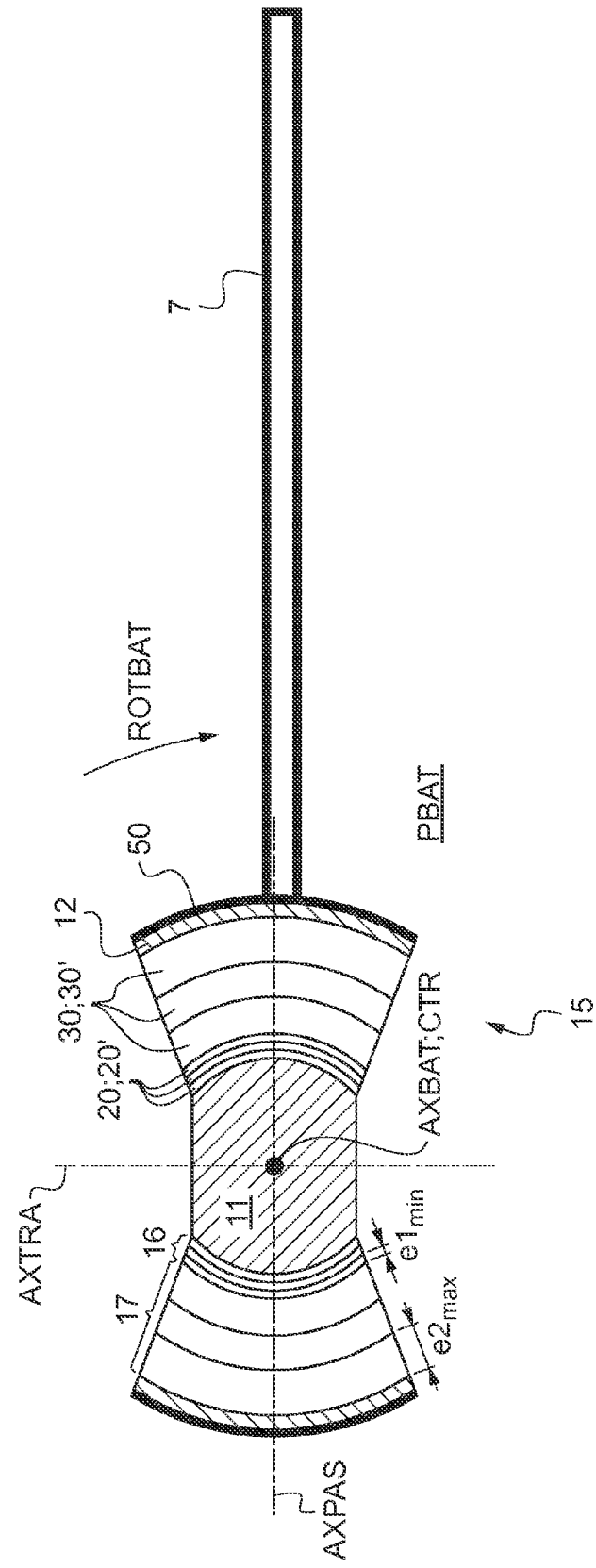

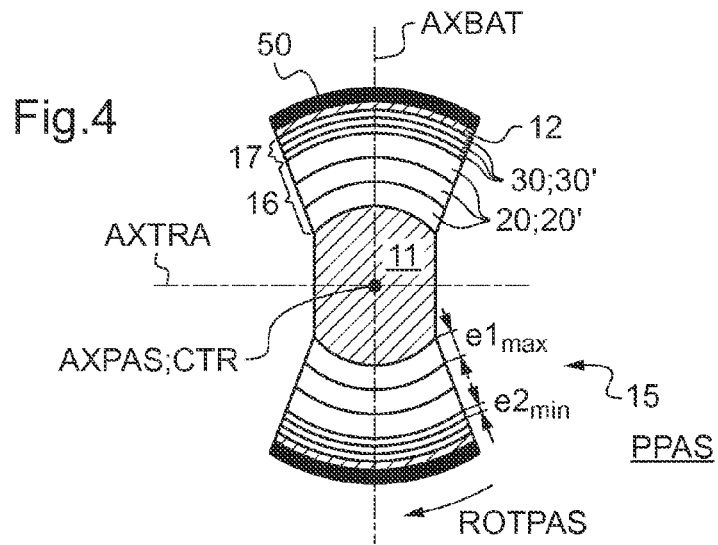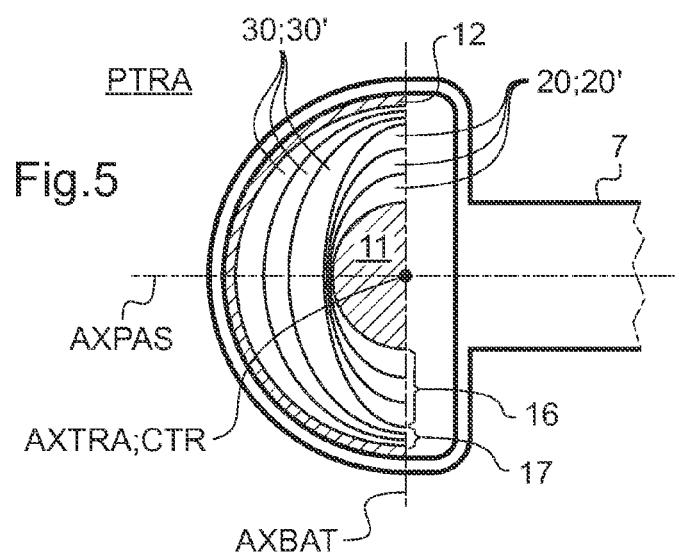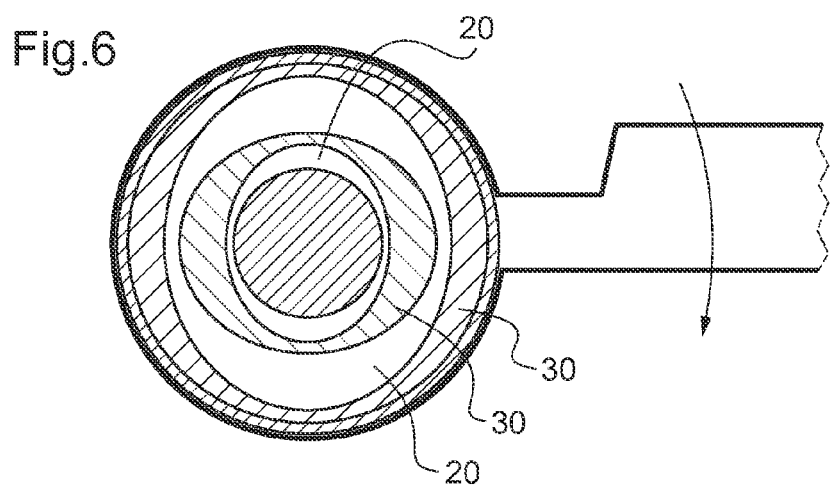

LAMINATED ABUTMENT, A ROTOR PROVIDED WITH SUCH AN ABUTMENT, AND AN AIRCRAFT

CROSS REFERENCE TO RELATED APPLICATIONS

This application claims priority to French patent application No. FR 11 04112 filed on Dec. 27, 2011, the disclosure of which is incorporated in its entirety by reference herein.

BACKGROUND OF THE INVENTION (1) Field of the Invention

The present invention relates to a laminated abutment, a rotor provided with such an abutment, and an aircraft. More particularly, the invention relates to a rotary-wing aircraft and to a rotor of its rotary wing.

A rotary-wing aircraft generally includes at least one rotor for providing lift and possibly propulsion. The lift rotor includes a hub carrying a plurality of blades.

(2) Description of Related Art

The rotor may thus include one laminated abutment per blade for hinging each blade to the hub about a flapping axis, a lead-lag axis, and a pitch-variation axis. Thus, each laminated abutment holds a blade on the hub of a rotorcraft rotor in hinged manner.

Document FR 2 497 173 describes a laminated abutment comprising a stack of alternating layers of flexible material and of a rigid material.

Document FR 2 497 173 seeks to limit the fatigue wear of an abutment by providing layers of flexible material in the shape of spherical caps having thicknesses that increase radially and progressively along an axis of symmetry going from an inner strength member to an outer strength member.

In addition, a rotor of a rotary-wing aircraft may include a device for avoiding the phenomena of ground resonance and of air resonance.

Such a device conventionally includes a lead-lag damper connecting each blade to the hub or to an adjacent blade, the damper bringing stiffness and damping to the drag vibration mode of the rotor. Such a damper is sometimes referred to as a "frequency adapter".

Document U.S. Pat. No. 5,449,152 describes tubular lead-lag dampers. In particular, document U.S. Pat. No. 5,449,152 discloses a lead-lag damper provided with layers of elastomers having different characteristics.

Document U.S. Pat. No. 4,886,419 proposes a laminated abutment for firstly hinging a blade to a hub, and secondly damping the lead-lag movements of the blade.

That abutment thus includes an inner strength member and an outer strength member, a stack of flexible main layers and of rigid secondary layers being arranged between the inner strength member and the outer strength member.

In that abutment, each main layer comprises two different materials.

Document U.S. Pat. No. 5,913,659 describes a device provided with a flat elastomeric damper and with a spherical elastomeric damper.

The following documents are also known: GB 660 560, US 2003/0235499, WO 2010/068209, EP 0 187 265, and U.S. Pat. No. 2,958,526. Document GB 660 560 describes a device for connecting together two members. In an embodiment, the device comprises three concentric tubes representing a central tube, an intermediate tube, and an outer tube.

A first layer of rubber is arranged between the central tube and the intermediate tube, and a second layer of rubber is arranged between the intermediate tube and the outer tube.

The first layer includes two sectors that are bonded to the central tube and to the intermediate tube, the sectors being connected together by circumferential portions that are bonded to the central tube.

In addition, the second layer includes two sectors that are bonded to the outer tube and to the intermediate tube, the sectors being connected together by circumferential portions that are bonded to the intermediate tube.

Thus, document GB 660 560 does not present a laminated abutment firstly for holding a blade on a hub and hinging it thereto, and secondly for adapting the drag vibration mode of a rotor.

BRIEF SUMMARY OF THE INVENTION

An object of the present invention is thus to provide a laminated abutment firstly for holding a blade on a hub and hinging it thereto, and secondly for adapting the drag vibration mode of a rotor.

In the invention, a laminated abutment, and in particular a laminated abutment of an aircraft rotor, comprises an inner strength member and an outer strength member, the abutment further comprising an elastomeric member comprising a stack of main layers and of secondary layers, each main layer comprising a single flexible material and each secondary layer comprising a single rigid material. Each secondary layer is bonded to each adjacent main layer.

Under such circumstances, the abutment does not present empty zones between a rigid layer and a flexible layer, contrary to document GB 660 560 that provides circumferential sections that do not bond to adjacent rigid layers.

It should be understood that the relative terms "flexible" and "rigid" enable the main and secondary layers to be identified clearly.

Under such circumstances, a strength member may perform rotary movements relative to the other strength member about a flapping axis, about a lead-lag axis, and about a pitch-variation axis, the flapping axis and the pitch-variation axis having a geometrical center in common, the pitch-variation axis and the flapping axis co-operating to define a lead-lag plane, the pitch-variation axis and the lead-lag axis co-operating to define a flapping plane, and the lead-lag axis and the flapping axis co-operating to define a plane of pitch-angle variation.

In addition, the laminated abutment is remarkable in particular in that the stack comprises at least one first main layer and at least one second main layer, each first main layer presenting, in said lead-lag plane, a first thickness that varies between a minimum first thickness on the pitch-variation axis and a maximum first thickness on the flapping axis, and each second main layer presenting, in said lead-lag plane, a second thickness that varies between a minimum second thickness on the flapping axis and a maximum second thickness on the pitch-variation axis, the thickness of each main layer being constant in the flapping plane and in the plane of pitch-angle variation.

The term "thickness" of a layer in a plane is used to designate the dimension of the layer, along a direction passing through the geometrical center, between two secondary layers or between a secondary layer and a strength member.

Thus, when a strength member performs rotary movements relative to the other strength member about the lead-lag axis, the zones having a minimum thickness and the zones having a maximum thickness of each main layer are stressed in series.

Each main layer thus presents a large amount of stiffness and damping during lead-lag movements of a blade.

Under such circumstances, the abutment presents a large amount of stiffness and damping in the lead-lag direction, making it possible to adapt the drag vibration mode of a rotor provided with the abutment. The thicknesses, and in particular the minimum thicknesses, are determined in order to obtain the desired stiffness and damping in the lead-lag direction.

Conversely, when a strength member performs rotary movements relative to the other strength member about the flapping axis or the pitch-variation axis, at least one main layer is stressed at a zone presenting a minimum thickness.

Each first main layer or each second main layer is always stressed during flapping or pitch movements in a zone presenting a minimum thickness.

In particular, since the thickness of each main layer is constant in the flapping plane and in the plane of pitch-angle variation, each first main layer presents a minimum first thickness in the flapping plane, and each second main layer presents a maximum second thickness in the flapping plane.

Thus, the minimum first thickness of the first main layers induces little stiffness and damping in flapping.

In addition, since the thickness of each main layer is constant in the flapping plane and in the plane of pitch-angle variation, each first main layer presents a maximum first thickness in the plane of pitch-angle variation, and each second main layer presents a minimum second thickness in the pitch-angle variation plane.

The minimum second thickness of the second main layers induces little stiffness and damping in pitch.

The abutment thus presents little stiffness and damping during pitch or flapping movements of one strength member relative to the other. The small amount of stiffness and damping makes it possible to minimize the introduction of forces that are undesirable and harmful to the operation of the rotor during pitch or flapping movements.

In addition, the abutment presents a large amount of stiffness and damping during lead-lag movements in order to minimize the risks of a ground- or air-resonance phenomenon appearing.

It should be observed that the frequency adaptation function is thus obtained by means of equipment, namely a laminated abutment arranged between the blade and the hub. Implanting this equipment presents the advantage of avoiding un-opposed collective movements of the blades appearing, which would require stop means to be used to limit the movements of the blades when the rotor is starting or stopping. In addition, implanting this equipment tends to avoid the appearance of a collective-mode resonance phenomenon that is difficult to damp by means of the inter-blade frequency adapters of the prior art.

Such a laminated abutment thus makes it possible to perform the roles both of a conventional laminated abutment and of a frequency adapter.

However, the laminated abutment remains simple to make in that each main layer is made out of a single material, unlike the teaching of document U.S. Pat. No. 4,886,419. The stiffness and damping characteristics thus vary as a function of the particular way the strength members move because of the particular shape of the main layers.

By way of example, each main layer may have an elastic shear modulus that is greater than or equal to 0.1 megapascals (MPa) and that is less than 10 MPa, a damping that is greater than or equal to 0.1 MPa, and a thickness that varies over the range 1 millimeter (mm) to 10 mm.

In an embodiment made out of a metal material, each secondary layer may have an elastic shear modulus that is greater than or equal to 80000 MPa, and thickness of about one-tenth of a millimeter.

The laminated abutment may also include one or more of the following additional characteristics.

In an embodiment, a first sub-assembly of at least one first main layer is arranged between the inner strength member and a second sub-assembly of at least one second main layer, the second sub-assembly being arranged between the first sub-assembly and the outer strength member, the first sub-assembly and the second sub-assembly including a common secondary layer.

It should be understood that the outer and inner strength members are comparable to rigid secondary layers.

In addition, the first sub-assembly and the second sub-assembly present a common secondary layer, the common secondary layer separating a first main layer of the first sub-assembly from a second main layer of the second sub-assembly.

In an alternative variant, each secondary layer arranged between the inner strength member and the outer strength member is arranged between a first main layer and a second main layer.

Under such circumstances, the stack may comprise successive alternating first and second adjacent main layers.

Fabrication of the abutment is thus facilitated.

In another aspect, the flexible material of the main layers may form part of the elastomer group.

The rigid material of the secondary layers may also form part of the group that comprises metals and reinforced plastics materials.

In addition, the laminated abutment is arranged between a blade and a hub, in particular so as to hinge the blade to the hub.

Under such circumstances, the outer strength member optionally includes connection means for connecting to a blade.

In addition, the inner strength member may include fastener means for fastening to the hub.

In another aspect, in the lead-lag plane, each main layer and each secondary layer may present first symmetry about the pitch-variation axis.

In addition, in the lead-lag plane, each main layer and each secondary layer may present second symmetry about the flapping axis.

Consequently, in a first embodiment, each main layer and each secondary layer presents first symmetry about the pitch-variation axis only in the lead-lag plane.

In a second embodiment, in the lead-lag plane, each main layer and each secondary layer presents first symmetry about the pitch-variation axis and second symmetry about the flapping axis.

In addition, it should be observed that each secondary layer optionally presents a third thickness that is constant in the flapping plane, the lead-lag plane, and the plane of pitch-angle variation.

In another variant, at least one secondary layer has third thickness that varies, with a sub-portion comprising the secondary layer of varying third thickness and a main layer adjacent to the secondary layer of thickness that is constant.

Fabrication of the abutment is thus facilitated.

In another aspect, the flapping axis, the pitch-variation axis, and the lead-lag axis may intersect the geometrical center.

However, in a variant seeking to optimize damping in the lead-lag direction, the lead-lag axis may be offset from the geometrical center.

In addition, the first thickness may vary continuously between said minimum first thickness and said maximum thickness, said second thickness varying continuously between said minimum second thickness and said maximum second thickness on the pitch-variation axis.

The term varying continuously is used to designate thickness that varies progressively or even linearly.

Such continuous variation optimizes the damping of the relative movements between the strength members.

In addition to a laminated abutment, the invention provides a rotor provided with such an abutment.

In the invention, a rotor is provided with a hub and with a plurality of blades, each blade being connected to the hub by a laminated abutment comprising an inner strength member and an outer strength member, said abutment further comprising an elastomeric member comprising a stack of main layers and of secondary layers, each main layer comprising a single flexible material and each secondary layer comprising a single rigid material. A strength member may perform rotary movements relative to the other strength member about a flapping axis of the blade, about a lead-lag axis, and about a pitch-variation axis of the blade, said flapping axis and said pitch-variation axis having a geometrical center in common, said pitch-variation axis and said flapping axis co-operating to define a lead-lag plane, said pitch-variation axis and said lead-lag axis co-operating to define a flapping plane, and said lead-lag axis and said flapping axis co-operating to define a plane of pitch-angle variation.

Said abutment is as described above in the invention.

Each blade is advantageously hinged to the hub by a laminated abutment of the invention.

In addition to a laminated abutment and a rotor, the invention also provides an aircraft provided with such a rotor.

BRIEF DESCRIPTION OF THE SEVERAL VIEWS OF THE DRAWINGS

The invention and its advantages appear in more detail from the following description of embodiments given by way of illustration and with reference to the accompanying figures, in which:

FIG. 2 is a section view of a laminated abutment in a lead-lag plane in a first embodiment;

FIG. 3 is a section view of a laminated abutment in a flapping plane in a first embodiment;

FIG. 4 is a section view of a laminated abutment in a plane of pitch-angle variation in a first embodiment;

FIG. 5 is a section view showing a laminated abutment in a second embodiment; and FIG. 6 shows a variant that optimizes fabrication of the abutment.

DETAILED DESCRIPTION OF THE INVENTION

Figure 1:
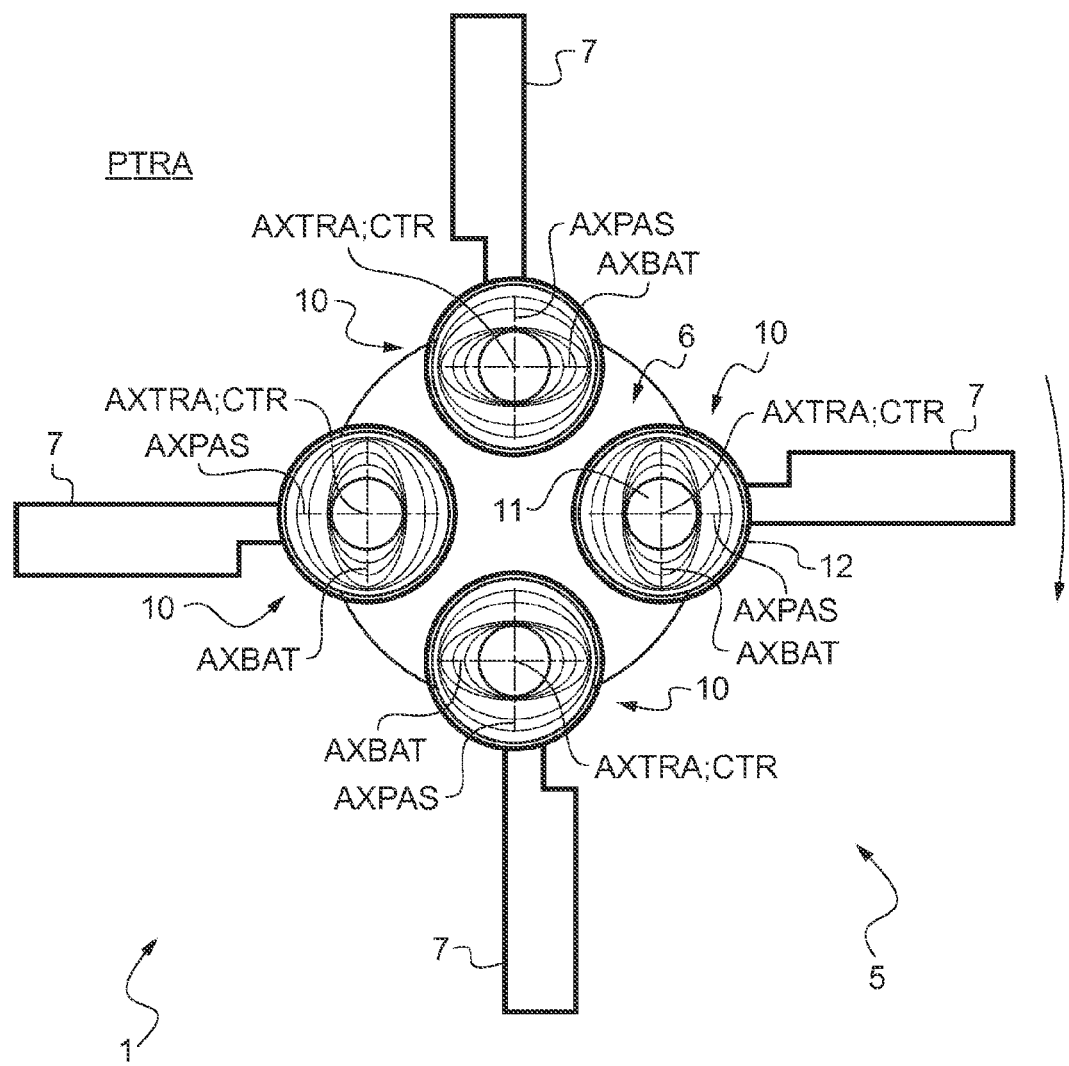
FIG. 1 shows an aircraft provided with a rotor including laminated abutments in a first embodiment.

Elements that are present in more than one of the figures are given the same references in each of them.

It should be observed that three mutually orthogonal directions AXTRA, AXBAT and AXPAS are associated with each laminated abutment shown and with the corresponding blade.

The direction AXTRA is referred to as the "lead-lag axis", this direction corresponding to the lead-lag axis of the associated blades.

Another direction AXBAT is referred to as the "flapping axis", this direction corresponding to the flapping axis of the associated blades.

Finally, the direction AXPAS is referred to as the "pitch-variation axis", this direction corresponding to the pitch-variation axis of the associated blades.

It should be observed that the lead-lag, flapping, and pitch-variation axes AXTRA, AXBAT, and AXPAS form a frame of reference for each laminated abutment and for the associated blade, the lead-lag, flapping, and pitch-variation axes AXTRA, AXBAT, and AXPAS intersecting at a geometrical center CTR.

However, in a variant that is not shown, the lead-lag axis AXTRA may be offset relative to the geometrical center CTR so as to optimize the lead-lag damping function. Nevertheless, the lead-lag axis still intersects the pitch axis.

In addition, for a laminated abutment and for its associated blade, the pitch-variation axis AXPAS and the flapping axis AXBAT co-operate to define a lead-lag plane PIRA of the blade, the pitch-variation axis AXPAS and the lead-lag axis AXTRA co-operate to define a flapping plane PBAT of the blade, and the lead-lag axis AXTRA and the flapping axis AXBAT co-operate to define a plane PPAS of pitch-angle variation.

FIG. 1 shows an aircraft provided with a rotor 5. It should be observed that the equipment of the aircraft 1 that does not form part of the rotor 5 is not shown, to avoid pointlessly overcrowding the figure.

The rotor 5 comprises a plurality of blades 7 carried by a hub 6. Each blade 7 is held on the hub 6 and hinged thereto by a laminated abutment, and preferably by a laminated abutment of the invention.

FIG. 2 is a section view in the lead-lag plane PTRA, showing a laminated abutment 10 in a first embodiment.

Independently of the embodiment, the laminated abutment comprises an inner strength member 11 and an outer strength member 12 surrounding an elastomeric member 15.

One strength member is thus secured to the hub of the rotor, while the other strength member is secured to a blade. For example, the inner strength member 11 is fastened to the hub 6 via fastener means that are not shown, the outer strength member 12 being fastened via connection means 50 to a blade 7.

Under such circumstances, the elastomeric member allows relative rotary movements between the inner strength member 11 and the outer strength member 12. More particularly, one strength member may perform rotary movements ROTTRA, ROTBAT, ROTPAS relative to the other about the lead-lag, flapping, and pitch-variation axes AXTRA, AXBAT, and AXPAS.

Consequently, in the embodiment shown, the outer strength member 12 and the associated blade 7 may perform rotary movements ROTTRA, ROTBAT, ROTPAS relative to the inner strength member about the lead-lag, flapping, and pitch-variation axes AXTRA, AXBAT, and AXPAS respectively.

The elastomeric member 15 comprises a stack of main layers 20, 30 and of secondary layers 40.

The stack may comprise only a single first main layer and only a single second main layer. However, the example shown comprises a plurality of first main layers and of second main layers.

Each main layer 20, 30 is thus secured to two secondary layers 40 that surround it, the inner and outer strength members 11 and 12 possibly representing extreme secondary layers.

Each first main layer 20 and each second main layer 30 is made from a single material 20', 30' that is flexible. Optionally, two distinct main layers may comprise two respective distinct flexible materials.

The flexible material 20', 30' of each main layer forms part of the elastomer group, for example.

In contrast, each secondary layer 40 is made from a single rigid material 40' that is rigid. Optionally, two distinct secondary layers may comprise two respective distinct rigid materials.

The rigid material 40' of each secondary layer forms part of the group comprising metals and reinforced plastics materials, for example.

Under such circumstances, in the variant shown in FIGS. 1 to 5, the stack of main layers and of secondary layers comprises a first sub-assembly 16 in the form of a stack of first main layers 20 and of secondary layers 40, and a second sub-assembly 17 in the form of a stack of second main layers 30 and of secondary layers 40.

For example, the first sub-assembly 16 is arranged between the inner strength member 11 and the second sub-assembly 17. The second sub-assembly 17 is thus arranged between the first sub-assembly 16 and the outer strength member 12.

The first sub-assembly 16 and the second sub-assembly 17 thus comprise a common secondary layer 41.

In the variant in FIG. 6, first main layers are arranged in alternation with second main layers.

Consequently, each secondary layer arranged between the inner strength member and the outer strength member is thus arranged between a first main layer and a second main layer.

Independently of the variant, each main layer thus presents a thickness that varies in the lead-lag plane, with the thickness of the first main layers 20 and the thickness of the second main layers 30 varying in application of first and second laws that are mutually opposite.

The term "thickness" is used to designate the dimension of the layers viewed in a plane along a direction DIR passing through the geometrical center CTR.

The thickness of each main layer thus varies angularly in the lead-lag plane, i.e. on turning the direction DIR about the lead-lag axis AXTRA.

Consequently, in the lead-lag plane PTRA, each first main layer 20 has a first thickness e1 that varies between a minimum first thickness $e1_{min}$ on the pitch-variation axis AXPAS and a maximum first thickness $e1_{max}$ on the flapping axis AXBAT, the variation optionally being cyclical and linear. The variation of the first thickness may be continuous.

All of the first main layers 20 may have the same thickness, and in particular the same minimum first thickness $e1_{min}$ and the same maximum first thickness $e1_{max}$.

In another variant, the minimum first thicknesses $e1_{min}$ and the maximum first thicknesses $e1_{max}$ may increase on going away from the inner strength member 11.

Other variants may optionally be envisaged.

Conversely, in the lead-lag plane PTRA, each second main layer 30 has a second thickness e2 that varies between a maximum second thickness $e2_{max}$ on the pitch-variation axis AXPAS and a minimum second thickness $e2_{min}$ on the flapping axis AXBAT, the variation optionally being cyclical and linear. The variation of the second thickness may be continuous.

All of the second main layers 30 may have the same thickness, and in particular the same minimum second thickness $e2_{min}$ and the same maximum second thickness $e2_{max}$.

In another variant, the minimum second thicknesses $e2_{min}$ and the maximum second thicknesses $e2_{max}$, may increase on going away from the inner strength member 11.

Other variants may optionally be envisaged.

Under such circumstances, when the blade 7 attached to the abutment 10 performs lead-lag rotary movements ROTTRA, stress is applied to each zone of the main layers that presents a minimum thickness and to each zone of the main layers that presents a maximum thickness.

Under such circumstances, the abutment 10 presents a large amount of stiffness and damping in the lead-lag direction, e.g. greater than 100,000 newton-meters per radian (N.m/rad) for a certain range of aircraft. The abutment 10 thus has an influence on the drag vibration mode of the rotor so as to at least reduce the risks of a ground- or air-resonance phenomenon appearing.

However, with reference to FIGS. 3 and 4, the thickness of each first and second main layer 20, 30 is constant in the flapping plane PBAT and in the plane PPAS of pitch-angle variation. FIG. 3 thus shows first main layers 20 having a minimum first thickness $e1_{min}$, and second main layers 30 having a maximum second thickness $e2_{max}$.

Under such circumstances, the abutment 10 presents little stiffness and damping in the flapping direction that are induced by the first main layers 20 when the blade 7 performs flapping rotary movements ROTBAT.

In addition, FIG. 4 thus presents first main layers 20 having a maximum first thickness $e1_{max}$, and second main layers 30 having a minimum second thickness $e2_{min}$.

Under such circumstances, the abutment 10 presents little stiffness and damping in the pitch direction that are induced by the second main layers 30 when the blade 7 performs pitch rotary movements ROTPAS.

In addition, with reference to FIGS. 2 to 4, it should be observed that each secondary layer 40 presents a third thickness e3 that is constant, in particular in the flapping plane PBAT, the lead-lag plane PIRA, and the plan PPAS of pitch-angle variation.

In another aspect and in the first embodiment in FIGS. 2 to 4, the elastomeric member 15 may present symmetry about the flapping plane PBAT, the lead-lag plane PIRA, and the plane PPAS of pitch-angle variation.

However, in the second embodiment, the elastomeric member 15 may present symmetry relative to the flapping plane PBAT, or the lead-lag plane PIRA.

Naturally, numerous implementation variations may be made to the present invention. Although several embodiments are described above, it can readily be understood that it is not conceivable to identify exhaustively all of the possible embodiments. It is naturally possible to replace any of the means described with equivalent means without going beyond the ambit of the present invention.

What is claimed is:

1. A laminated abutment comprising an inner strength member and an outer strength member, the abutment further comprising an elastomeric member comprising a stack of main layers and of secondary layers, each main layer comprising a single flexible material and each secondary layer comprising a single rigid material, a strength member of the inner strength member and the outer strength member being able to perform rotary movements relative to the other strength member of the inner strength member and the outer strength member about a flapping axis, about a lead-lag axis, and about a pitch-variation axis the flapping axis and the pitch-variation axis having a geometrical center in common, the pitch-variation axis and the flapping axis co-operating to define a lead-lag plane, the pitch-variation axis and the lead-lag axis co-operating to define a flapping plane, and the lead-lag axis and the flapping axis co-operating to define a plane of pitch-angle variation, each secondary layer being bonded to each adjacent main layer; wherein the stack comprises at least one first main layer and at least one second main layer, each first main layer presenting, in the lead-lag plane, a first thickness that varies between a minimum first thickness on the pitch-variation axis and a maximum first thickness on the flapping axis, and each second main layer presenting, in the lead-lag plane, a second thickness that varies between a minimum second thickness on the flapping axis and a maximum second thickness on the pitch-variation axis, the thickness of each main layer being constant in the flapping plane and in the plane of pitch-angle variation.

2. The laminated abutment according to claim 1, wherein the laminated abutment comprises a first sub-assembly of a respective first layer of the at least one first main layer that is arranged between the inner strength member and a second sub-assembly of a respective second layer of the at least one second main layer, the second sub-assembly being arranged between the first sub-assembly and the outer strength member, the first sub-assembly and the second sub-assembly including a common secondary layer.

3. The laminated abutment according to claim 1, wherein the flexible material of the main layers includes an elastomer.

4. The laminated abutment according to claim 1, wherein the rigid material of the secondary layers includes metal or reinforced plastics material.

5. The laminated abutment according to claim 1, wherein the outer strength member is connected to a blade.

6. The laminated abutment according to claim 1, wherein the inner strength member is fastened to the hub.

7. The laminated abutment according to claim 1, wherein, in the lead-lag plane, each main layer and each secondary layer presents first symmetry about the pitch-variation axis.

8. The laminated abutment according to claim 7, wherein, in the lead-lag plane, each main layer and each secondary layer presents second symmetry about the flapping axis.

9. The laminated abutment according to claim 1, wherein each secondary layer presents a third thickness that is constant in the flapping plane, the lead-lag plane, and the plane of pitch-angle variation.

10. The laminated abutment according to claim 1, wherein at least one secondary layer has a third thickness that varies, with a sub-portion comprising the secondary layer of varying third thickness and a main layer adjacent to the secondary layer of thickness that is constant.

11. The laminated abutment according to claim 1, wherein each secondary layer arranged between the inner strength member and the outer strength member is arranged between a respective first main layer of the at least one first main layer and a respective second layer of the at least one second main layer.

12. The laminated abutment according to claim 1, wherein the lead-lag axis is offset from the geometrical center.

13. The laminated abutment according to claim 1, wherein the first thickness varies continuously between the minimum first thickness and the maximum thickness, the second thickness varying continuously between the minimum second thickness and the maximum second thickness on the pitch-variation axis.

14. The laminated abutment of claim 1, wherein the maximum first thickness exceeds the minimum first thickness, and wherein the maximum second thickness exceeds the minimum second thickness.

15. A rotor provided with a hub and with a plurality of blades, each blade being connected to the hub by a laminated abutment in accordance with claim 1.

16. An aircraft, including a rotor according to claim 15.

17. A laminated abutment comprising:
an inner strength member;
an outer strength member disposed about the inner strength member; and
an elastomeric member having a first flexible layer, a second flexible layer, and a rigid layer disposed between and bonded to the first flexible layer and the second flexible layer, the first flexible layer and the second flexible layer having a same material composition, the elastomeric layer having a lead-lag plane, a pitch-angle plane orthogonal to the lead-lag plane, a flapping motion plane orthogonal to the lead-lag plane and to the pitch-angle plane, a pitch axis extending within the lead-lag plane, and a flapping axis extending orthogonal to the pitch axis within the lead-lag plane, wherein in the lead-lag plane the first flexible layer has a first varying thickness with a first flexible layer maximum thickness on the flapping axis and a first flexible layer minimum thickness on the pitch axis, in the lead-lag plane the second flexible layer has a second varying thickness with a second flexible layer maximum thickness on the pitch axis and a second flexible layer minimum thickness on the flapping axis, and in the flapping motion plane and the pitch-angle plane the first flexible layer has a first generally constant thickness and the second layer has a second generally constant thickness.

18. A rotorcraft comprising:
a fuselage;
a rotor hub projected from and rotatably coupled to the fuselage, the rotor hub having an axis of rotation;
a rotor blade extending from the rotor hub and having a blade root, a blade tip, a pitch axis extending from the blade root to the blade tip; and
an abutment having a first member coupled to the rotor hub, a second member coupled to the blade root, and an elastomeric member disposed between the first member and the second member, the elastomeric member having a first flexible layer, a second flexible layer, and a rigid layer disposed between and bonded to the first flexible layer and the second flexible layer, the first flexible layer and the second flexible layer having a same material composition, the abutment having a lead-lag axis extending generally parallel to the axis of rotation, a flapping axis extending perpendicular to the pitch axis and the lead-lag axis, a lead-lag plane defined by the flapping axis and the pitch axis, a flapping motion plane defined by the lead-lag axis and the pitch axis, and a pitch-angle plane defined by the lead-lag axis and the flapping axis, wherein in the lead-lag plane the first flexible layer has a first varying thickness with a first flexible layer maximum thickness on the flapping axis and a first flexible layer minimum thickness on the pitch axis, in the lead-lag plane the second flexible layer has a second varying thickness with a second flexible layer maximum thickness on the pitch axis and a second flexible layer minimum thickness on the flapping axis, and in the flapping motion plane and the pitch-angle plane the first flexible layer has a first generally constant thickness and the second layer has a second generally constant thickness.

19. The rotorcraft of claim 18, wherein the first flexible layer maximum thickness is greater than the first flexible layer minimum thickness, and the second flexible layer maximum thickness is greater than the second flexible layer minimum thickness.

20. The rotorcraft of claim 18, wherein the elastomeric member further includes an additional first flexible layer and an additional second flexible layer, wherein in the lead-lag plane the additional first flexible layer has an additional first varying thickness with an additional first flexible layer maximum thickness on the flapping axis and an additional first flexible layer minimum thickness on the pitch axis, in the lead-lag plane the additional second flexible layer has an additional second varying thickness with an additional second flexible layer maximum thickness on the pitch axis and an additional second flexible layer minimum thickness on the flapping axis, and in the flapping motion plane and the pitch-angle plane the additional first flexible layer has an additional first generally constant thickness and the additional second layer has an additional second generally constant thickness.

* * * * *